Figure 1:
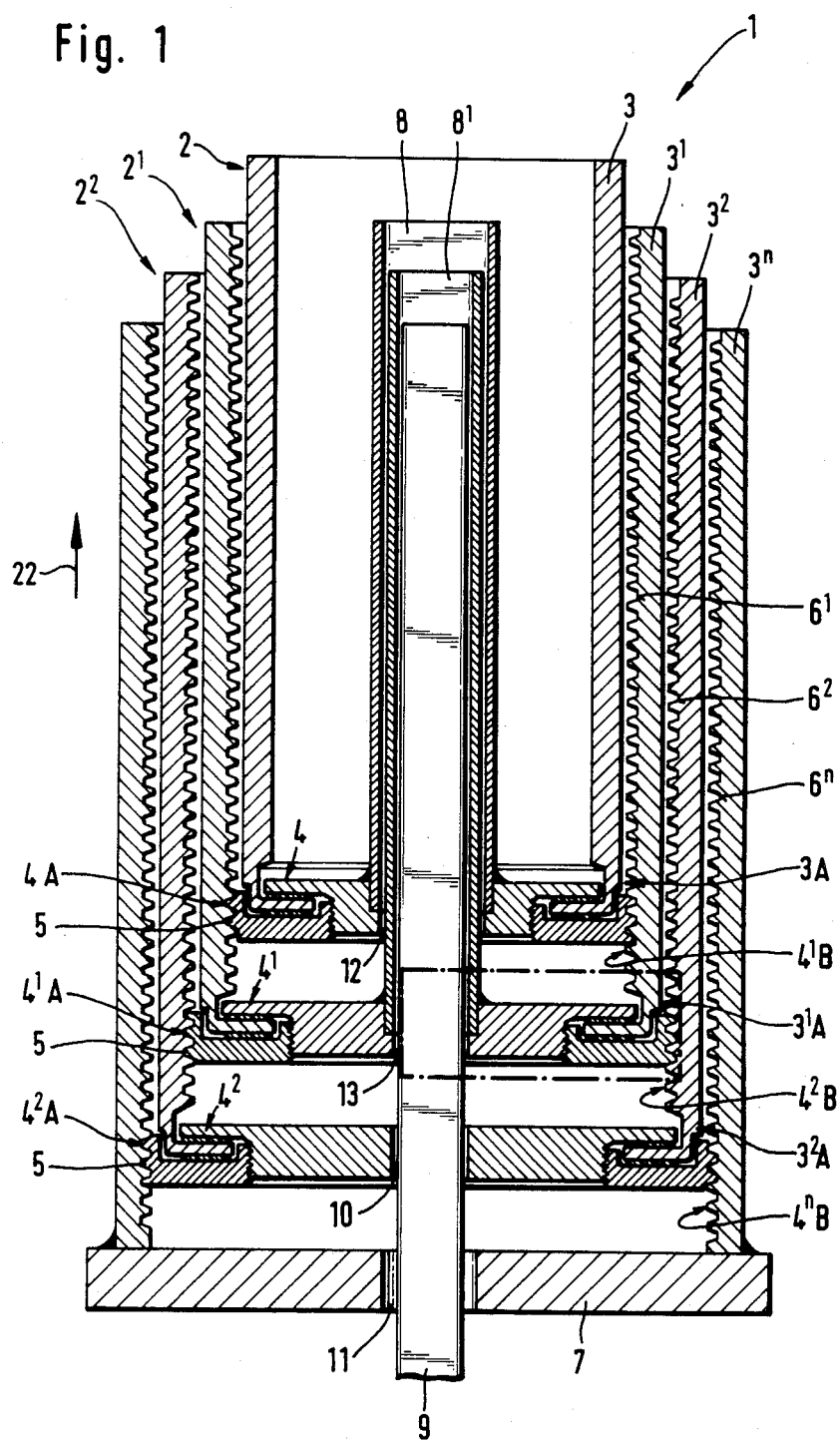

United States Patent [19]

Svensson

[11] Patent Number: 4,651,581

[45] Date of Patent: Mar. 24, 1987

[54] INFLUENCING ARRANGEMENT WITH TELESCOPICALLY VARIABLE LENGTH

[76] Inventor: Ingemar Svensson, Benzelsväg 22, 443 00 Lerum, Sweden

[21] Appl. No.: 691,528

[22] PCT Filed: Apr. 24, 1984

[86] PCT No.: PCT/SE84/00151

§ 371 Date: Dec. 21, 1984

§ 102(e) Date: Dec. 21, 1984

[87] PCT Pub. No.: WO84/04371

PCT Pub. Date: Nov. 8, 1984

[30] Foreign Application Priority Data

Apr. 25, 1983 [SE] Sweden ................................ 8302312

[51] Int. Cl.$^4$ ............................................. F16H 25/20
[52] U.S. Cl. .................................. 74/89.15; 74/424.8 R
[58] Field of Search ......... 74/89.15, 424.8 R, 424.8 B

[56] References Cited

U.S. PATENT DOCUMENTS

| | | | |
|---|---|---|---|
| 1,279,346 | 9/1918 | Hultgren et al. | 248/405 |
| 1,705,232 | 3/1929 | Brantingson | 74/424.8 R |
| 1,912,230 | 5/1933 | Statz | 74/424.8 B |
| 3,404,580 | 10/1968 | Valenti | 74/424.8 R |
| 3,404,581 | 10/1968 | Kraus | 74/424.8 R |
| 3,422,696 | 1/1969 | Valenti | 74/424.8 R |
| 3,592,070 | 7/1971 | Hammond | 74/424.8 R |

FOREIGN PATENT DOCUMENTS

| | | | |
|---|---|---|---|
| 1260800 | 2/1968 | Fed. Rep. of Germany | 248/405 |
| 705174 | 12/1979 | U.S.S.R. | 74/89.15 |

Primary Examiner—Lawrence J. Staab

[57] ABSTRACT

An influencing arrangement with telescopically variable length, comprising an influencing member which can be actuated by the drive shaft and moved its longitudinal. The invention makes is possible to provide an arrangement which among other things is compact and has considerable stroke-length, and which consists of few complicated parts. A plurality of influencing members $(2,2',2^2)$ which are disposed co-axially relative to each other and have an outer and/or inner thread element, are connected together via a plurality of rotatable, telescopically connected drive shaft devices (8, 8') with a non-circular cross-section part, whereby rotation of the main rotary drive shaft (9) in one direction of rotation causes the said influencing members $(2,2'2^2)$ to be screwed out in order to extend the arrangement, and rotation of the said main rotary drive shaft in the opposite direction of the rotation causes the said influencing members to be screwed in and closed up one inside the other.

9 Claims, 3 Drawing Figures

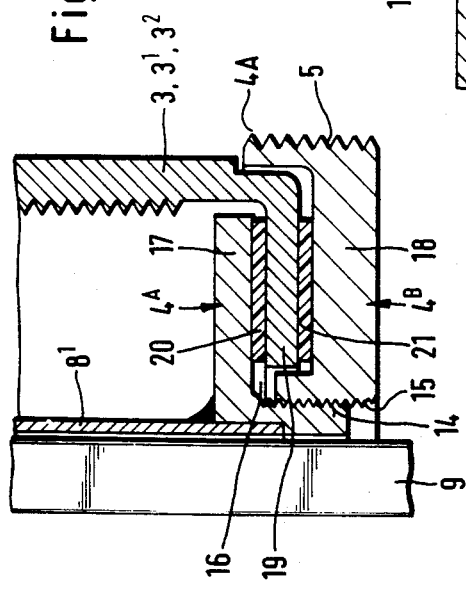
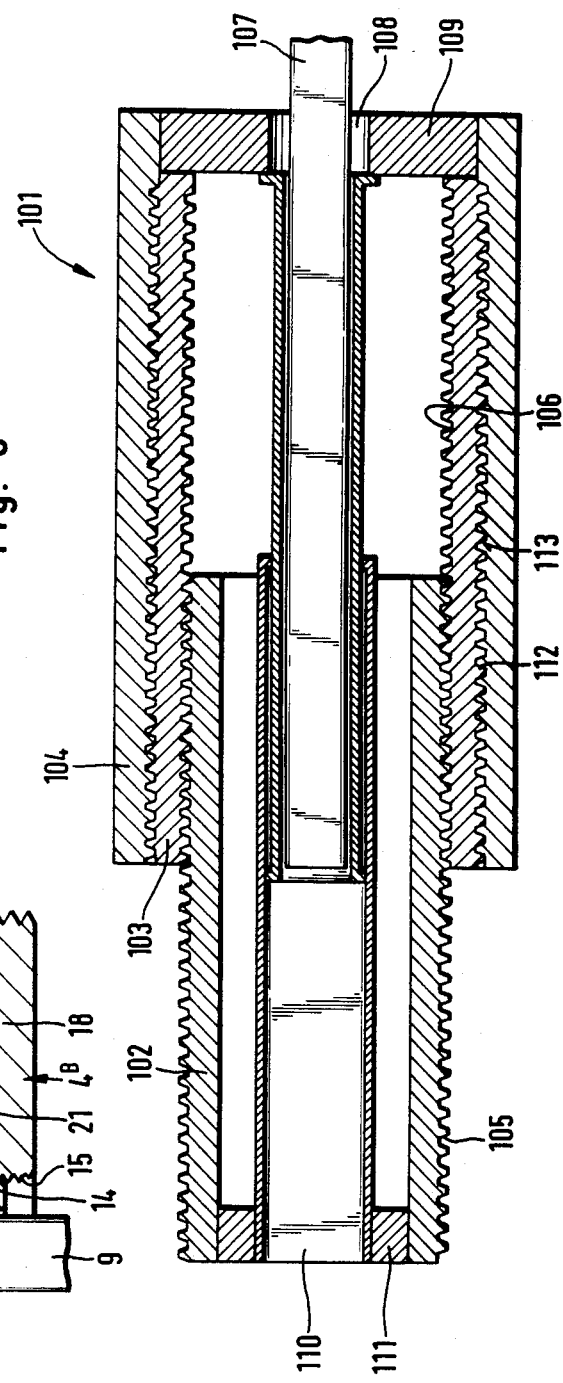

INFLUENCING ARRANGEMENT WITH TELESCOPICALLY VARIABLE LENGTH

The present invention relates to an influencing arrangement with telescopically variable length, comprising an influencing member which can be actuated by a drive shaft and moved in its longitudinal direction.

The main object of the present invention is primarily to provide an arrangement of the above-mentioned kind which is compact and also has a considerable stroke length and which is of simple construction with few complicated parts.

The said object is achieved by means of an arrangement of the above-mentioned type which is essentially characterized in that a plurality of influencing members, which are disposed co-axially relative to each other and have an outer and/or inner threaded element, are connected together via a plurality of rotatable, telescopically connected drive shaft devices with a non-circular cross-sectional part, so that rotation of the main rotary drive shaft in one direction of rotation causes the said influencing members to be screwed out in order to extend the arrangement, and rotation of the said main rotary drive shaft in the opposite direction of rotation causes the said influencing members to be screwed in and closed up one inside the other.

The invention is described below by way of two preferred embodiment examples, with reference to the accompanying drawings, on which FIG. 1 is a schematic longitudinal section through an influencing arrangement constructed according to the invention shown in the retracted state, FIG. 2 shows in detail part of an influencing member appertaining to the arrangement, and FIG. 3 shows a further embodiment of an influencing arrangement constructed according to the invention, shown in partially extended state.

An influencing arrangement constructed according to the invention, which is shown in FIGS. 1 and 2 and which is designated by the numeral 1, comprises a plurality of mutually coaxial influencing members 2, 2', $2^2$, etc., which preferably consist of a tube 3, 3', $3^2$ etc. with a nut element 4, 4', $4^2$ etc. connected rotatably to one of their ends 3A, 3'A, $3^2$A, etc., for example. The nut elements 4, 4', $4^2$ have outer threaded elements 5 along their respective outer casing surface 4A, 4'A, $4^2$A, while a number of the tubes 2', $2^2$ have an internal threaded element 6', $6^2$ along their inner casing surface 4'B, $4^2$B. A further tube $3^n$, which has only an inner thread element $6^n$, is securely connected to a motor baseplate 7.

A plurality of drive shaft devices 8, 8', etc. which have a non-circular cross-section part, preferably formed by a four-sided tube or having some other irregular circumferential shape, are connected non-rotatably to each other or to a main rotary drive shaft 9. Expediently, the majority of the said drive shaft devices 8 are connected, for example by welding, to an associated nut element 4, 4', while the shaft 9 extends freely through a shaft passage aperture 10 adapted to the shape of the shaft 9 at the nut element $4^2$ which is located nearest to the motor baseplate 7, in order to effect rotation of the said nut element $4^2$. A hole 11 which is larger than the maximum cross-section of the shaft 9 extends through the motor baseplate 7 and enables the shaft 9 to rotate without being obstructed by the baseplate 7. Shaft passageways 12 and 13 at the nut elements 4 and 4' also allow shafts 8, 8', 9 received therein to move freely.

The nut elements 4–$4^2$ may consist of two halves $4^A$ and $4^B$ respectively which can be connected to each other by connecting means which may consist of threads 14 and 15 respectively, and after being connected together they can be locked by means of adhesive for example. In the connected state by intervening space 16 is formed between the two half-nuts $4^A$, $4^B$, between a flange 17 or 18 respectively projecting in the radial direction from each half-nut. The said intervening space 16 is designed to receive a part 19, preferably an annular flange 19 extending radially relative to the axial direction of the tube on an associated tube 3–$3^2$ which can be connected thereto. Expediently, friction-reducing elements 20 and 21 respectively are provided on either planar face of the said flange 19, for example a suitable coating of some kind, so that a sliding bearing area is formed on either side of the said flange 19 and facilitates rotary movement between the tubes 3–$3^2$ and the nut elements 4–$4^2$ connected to them.

In order that the tubes 3–$3^2$ do not rotate relative to each other, the tubes which are connected to an adjoining tube are connected via a rotation-preventing device; however, this is not shown on the drawings. This may consist for example of a longitudinal keyway on one of the tubes with a spline mounted on the other tube and able to enter into the said keyway and be displaced along it when the associated nut element 4–$4^2$ is rotated.

The functioning of the above-described arrangement, which can be used for transmitting movement from a rotary drive source to a desired point located at a distance from the said drive source to produce linear movement, like a jack, is as follows: When the nut element $4^2$ is screwed upwards in the direction of the arrow 22, for example, under the effect of the shaft 9 and co-action with the passage 10, the associated tube $3^2$ is positioned with the nut element 4' on the said nut element $4^2$. As the drive is continued, the nut elements 4–$4^2$ are screwed in the direction of the arrow 22, causing a rising movement to occur with the next tube, etc., so that a stroke-length of substantially four times the structural length is possible with the example shown. Based on the drawing, the said stroke-length amounts to approximately 470 mm, with an overall structural height of only 140 mm. If it is desired to increase the stroke-length, all the tubes are made the same overall length, thus increasing the structural height by 30 mm. If it is desired to have a completely level state for the structural height then each tube is reduced in stroke-length by the thickness (10 mm) of the nut lying below, which gives a stroke-length of approximately 560 mm.

FIG. 3 shows an influencing arrangement 101 wherein the influencing members are formed only fo tubes 102, 103, 104, etc. Threaded elements 105 in the form of trapezoidal threads e.g., arranged over the outer circumference of an inner tube 102, can co-act with a corresponding complementary threaded element 106 disposed over the internal periphery of an adjoining surrounding tube 103, so that when one 102 of the tubes is rotated under the effect of a drive shaft 107 which projects in through a hole 108 in the end wall 109 on a fixed outer tube 104 and which co-acts with an inner non-circular shaft 110 which is connected via a ring 111 to the said inner tube 102, the two tubes 102, 103 move relative to each other. When the tube 102 reaches a substantially fully-extended position defined by a stop arrangement, the tube 103 is screwed out by co-action between an outer thread element 112 and an inner thread element 113 on the tubes 103, 104 respectively, in the direction away from the said fixed tube 104. The displacement movement of the tubes 102, 103 is reversed when the drive direction of the shaft 107 is reversed.

The invention is not limited to the embodiment examples described above and shown on the drawings, but can be modified within the framework of the following Patent Claims without exceeding the concept of the invention.

I claim:

1. A telescoping device comprising: a plurality of elongated tubular members arranged concentrically one within the other, each tubular member having a circumferential thread; a plurality of nut elements, each nut element having a thread meshing with the thread of the adjacent tubular member, and a central opening in each nut element; a plurality of drive shaft devices respectively associated with said plurality of nut elements and respectively arranged non-rotatably with respect to each other and arranged concentrically one within the other; and a rotary main drive shaft extending axially in the center of said device, and non-rotatably through said openings and through said drive shaft devices; each tubular member having a circumferential inner thread, each nut element having a circumferential outer thread for meshing engagement with an outwardly adjacent tubular member, each nut element also having two radial flanges, a space between said flanges, and a part of an adjacent tubular member in said space; whereby rotation of the main rotary drive shaft in one direction screws the tubular members axially outwardly to extend the telescoping device, and rotation of said main rotary drive shaft in the opposite direction screws the tubular members axially inwardly one within the other.

2. A device according to claim 1, wherein friction-reducing means are provided in said space between said part and the flanges.

3. A device according to claim 1 or 2, wherein said two flanges have co-operating connecting means.

4. A device according to claim 3, wherein said co-operating connecting means are threads.

5. A device according to claim 4, comprising means for locking said connecting means to each other.

6. A device according to claim 1, wherein said part is a radial flange.

7. A device according to claim 1, comprising means for non-rotatably interconnecting two adjacent tubular members.

8. A device according to claim 7, wherein said connecting means is a keyway and a cooperating key.

9. A telescoping device comprising: a plurality of elongated tubular members arranged concentrically one within the other, each tubular member having a circumferential thread; a plurality of nut elements, each nut element having a thread meshing with the thread of the adjacent tubular member, and a central opening in each nut element; a plurality of drive shaft devices respectively associated with said plurality of nut elements and respectively arranged non-rotatably with respect to each other and arranged concentrically one within the other; and a rotary main drive shaft extending axially in the center of said device, and non-rotatably through said openings and through said drive shaft devices; said drive shaft devices being four-sided tubes received one inside the other, said tubes being non-rotatably connected to the respective nut element, and said main rotary drive shaft being non-rotatably connected to one of said four-sided tubes; whereby rotation of the main rotary drive shaft in one direction screws the tubular members axially outwardly to extend the telescoping device, and rotation of said main rotary drive shaft in the opposite direction screws the tubular members axially inwardly one within the other.

* * * * *